(12) United States Patent
Saxton et al.

(10) Patent No.: US 8,418,170 B2
(45) Date of Patent: Apr. 9, 2013

(54) METHOD AND SYSTEM FOR ASSESSING DEPLOYMENT AND UN-DEPLOYMENT OF SOFTWARE INSTALLATIONS

(75) Inventors: Allen H. Saxton, Schaumburg, IL (US); Rayomand Ichhaporia, Schaumburg, IL (US)

(73) Assignee: Flexera Software LLC, Schaumburg, IL (US)

(*) Notice: Subject to any disclaimer, the term of this patent is extended or adjusted under 35 U.S.C. 154(b) by 1166 days.

(21) Appl. No.: 12/021,829

(22) Filed: Jan. 29, 2008

(65) Prior Publication Data

US 2009/0193411 A1 Jul. 30, 2009

(51) Int. Cl.
*G06F 9/445* (2006.01)
(52) U.S. Cl.
USPC .................. 717/174; 717/175; 717/177
(58) Field of Classification Search ............. 717/174
See application file for complete search history.

(56) References Cited

U.S. PATENT DOCUMENTS

| | | | |
|---|---|---|---|
| 6,536,040 B1* | 3/2003 | Curtis | 717/174 |
| 7,350,204 B2* | 3/2008 | Lambert et al. | 717/175 |
| 7,765,540 B2* | 7/2010 | McCollum et al. | 717/174 |
| 2002/0174348 A1 | 11/2002 | Ting | |
| 2003/0140007 A1* | 7/2003 | Kramer et al. | 705/40 |
| 2003/0145123 A1* | 7/2003 | Berndt et al. | 717/177 |
| 2005/0257226 A1* | 11/2005 | Belvin et al. | 717/175 |
| 2007/0169110 A1 | 7/2007 | Gupta et al. | |
| 2007/0180509 A1* | 8/2007 | Swartz et al. | 726/9 |
| 2007/0289019 A1* | 12/2007 | Lowrey | 726/24 |
| 2008/0120611 A1* | 5/2008 | Aaron | 717/174 |
| 2009/0007096 A1* | 1/2009 | Chavez et al. | 717/177 |
| 2009/0119501 A1* | 5/2009 | Petersen | 713/100 |

FOREIGN PATENT DOCUMENTS

WO PCT/2009/032012 3/2009

OTHER PUBLICATIONS

Yang Yu, A Feather-weight Virtual Machine for Windows Applications, 2006, ACM, 11 pages, <URL: http://delivery.acm.org/10.1145/1140000/1134766/p24-yu.pdf>.*
Eugene Libster, A Proposal for an Integrated Memory Acquisition Mechanism, 2008, ACM, 7 pages, <URL: http://delivery.acm.org/10.1145/1370000/1368510/p14-libster.pdf>.*
Faraz Ahmed, Using Spatio-Temporal Information in API Calls with Machine Learning Algorithms for Malware Detection, 2009, ACM, 8 pages, <URL: http://delivery.acm.org/10.1145/1660000/1655003/p55-ahmed.pdf>.*
Christopher Augeri, An Analysis of XML Compression Efficiency, 2007, ACM, 12 pages, <URL: http://delivery.acm.org/10.1145/1290000/1281707/a7-augeri.pdf>.*

(Continued)

*Primary Examiner* — Matt Kim
*Assistant Examiner* — Hua Lu
(74) *Attorney, Agent, or Firm* — Michael A. Glenn; Glenn Patent Group

(57) ABSTRACT

A method and system for assessing deployment and un-deployment of a software application installation are disclosed. In one embodiment, the method comprises receiving as an input a software application installation. Native code is extracted from the software application installation and executed. Information regarding the execution of the native code is provided to a user.

6 Claims, 4 Drawing Sheets

OTHER PUBLICATIONS

Alejandro Villegas, PPSAM: Proactive PowerShell Anti-Malware, 2011, Google Scholar, 7 pages, <URL: http://weblidi.info.unlp.edu.ar/WorldComp2011-Mirror/SAM8172.pdf>.*

Ran Canetti, Nerus: Vulnerability Mitigation Via OS-Aided, Self-Imposed Restrictions, 2012, Google Scholar, 22 pages, <URL:http://www.cs.tau.ac.il/~benriva/nerus_man.pdf>.*

* cited by examiner

100

METHOD AND SYSTEM FOR ASSESSING DEPLOYMENT AND UN-DEPLOYMENT OF SOFTWARE INSTALLATIONS

FIELD OF THE INVENTION

The field of the invention relates generally to computer systems and more particularly relates to a method and system for assessing deployment and un-deployment of software installations.

BACKGROUND OF THE INVENTION

Typically, software installations encode information about their underlying behaviors and dependencies. But the long period between authoring the installations and eventual retirement of software applications means that information regarding the installations' underlying behaviors and dependencies is often lost. Specifically, many software installations and installation technologies (including but without limitation Microsoft Windows Installer ("MSI")) execute some native compiled code to complete certain aspects of the installation process. While such native code may not be part of the installed software applications, its existence may explain why certain software application components were installed or how they were installed. Specifically, the existence of the native code within the software application installation may imply that the underlying software application being installed has some secondary dependency on some physical aspect of the computer system which the installation author feels compelled to analyze in order to properly complete the software application installation. However, users such as IT administrators often cannot discover why the software installation needs to execute such native code, for example, because the IT administrators usually do not have physical access to the original source code. For example, authors of the software installations may not have provided documents explaining why such native code is necessary. Without this information, it is difficult for users to decide whether to retire an installed software application or to transition an existing software application into a new enterprise network.

SUMMARY

A method and system for assessing deployment and un-deployment of a software application installation are disclosed. In one embodiment, the method comprises receiving as an input a software application installation. Native code is extracted from the software application installation and executed. Information regarding the execution of the native code is provided to a user.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

Figure 1:
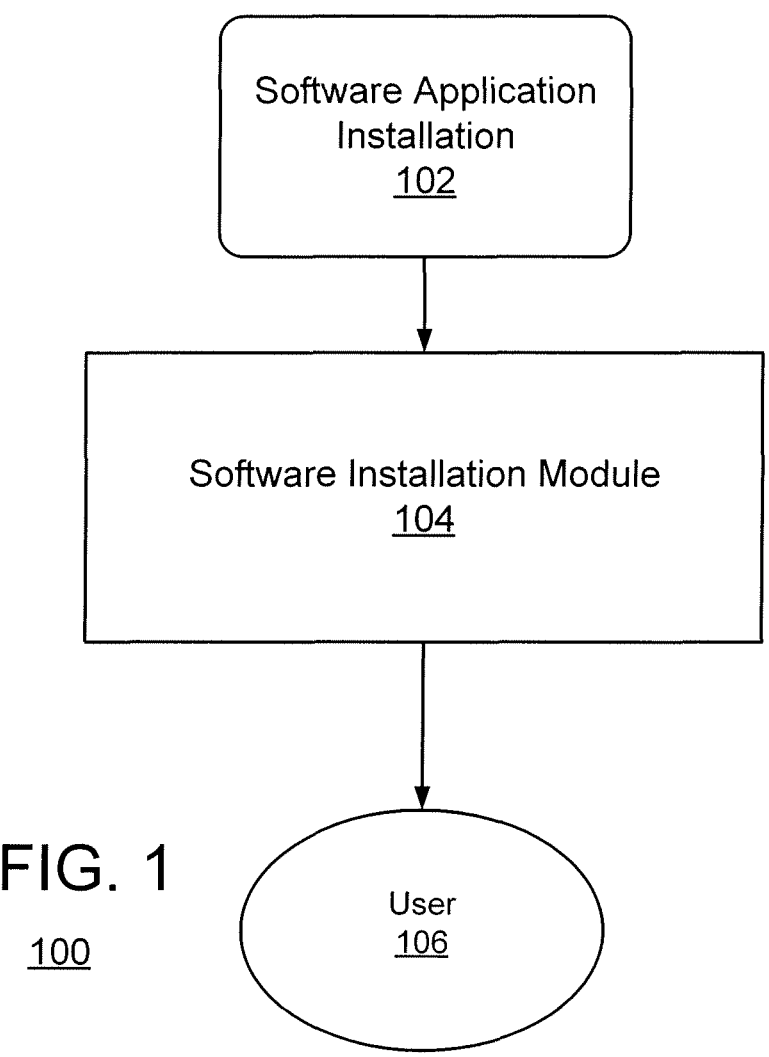
FIG. 1 illustrates a block diagram of an exemplary software installation network, according to one embodiment of the present invention.

A method and system for assessing deployment and un-deployment of a software application installation are disclosed. In one embodiment, the method comprises receiving as an input a software application installation. Native code is extracted from the software application installation and executed. Information regarding the execution of the native code is provided to a user.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, the following terms may have the following meanings without regard to its upper or lower case usage. However, one of ordinary skill would understand that additional embodiments may contemplate additional terms and/or variation of these terms.

"Software installation module" may mean any combination of software, firmware, and/or hardware that allows a user to analyze software application installations.

"Extraction module" may mean any combination of software, firmware, and/or hardware that receives a software application installation and extract native code embedded in the software application installation.

"Execution module" may mean any combination of software, firmware, and/or hardware that executes native code embedded in a software application installation.

"User interface module" may mean any combination of software, firmware, and/or hardware that provides information regarding a software application installation to a user.

Figure 2:
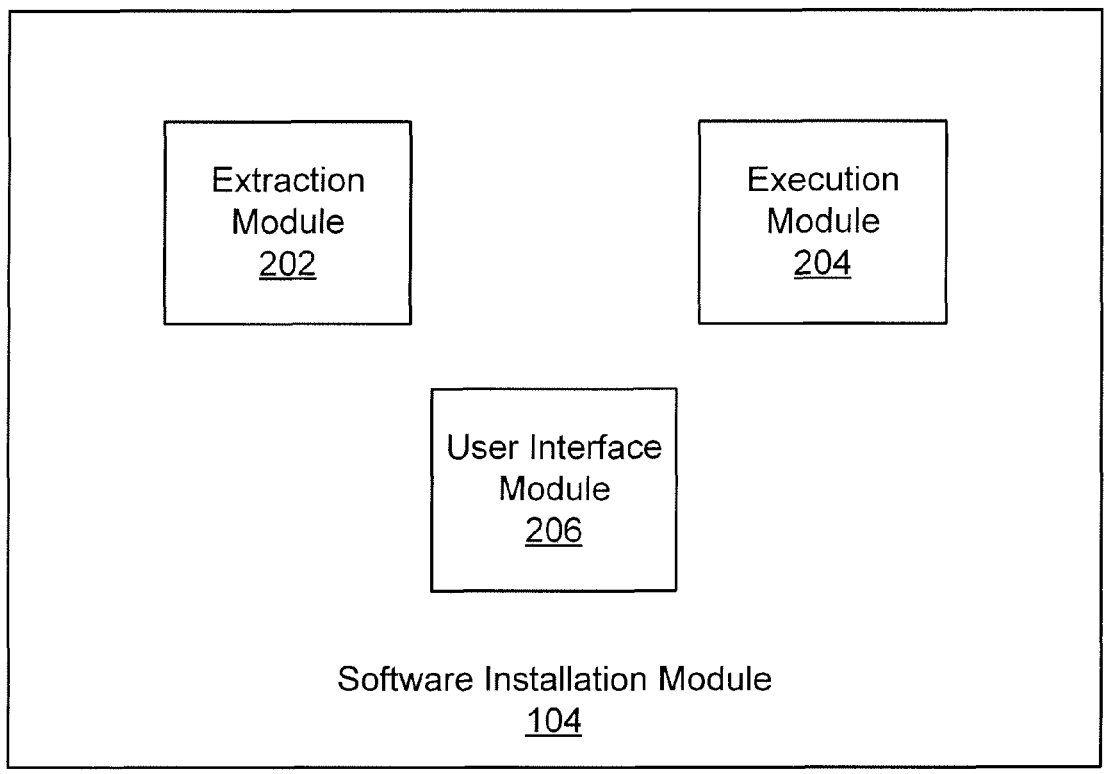
FIG. 2 illustrates a block diagram of an exemplary software installation module, according to one embodiment of the present invention.

FIGS. 1-2 illustrate block diagrams of an exemplary software installation system, according to embodiments of the present invention. In addition to software installation systems, it is to be appreciated that other systems employing the various teachings herein may also be used to practice the various aspects of the present invention, and as such, are considered to be within its full scope.

FIG. 1 illustrates a block diagram of an exemplary software installation network 100. In this exemplary software installation network 100, a software application installation 102 is provided to a software installation module 104. For example, software installation module 104 may reside on a computer system of a user 106 (e.g., an IT administrator) who is managing the deployment of software applications to an enterprise network.

Software installation module 104 is configured to receive software application installation 102 and to assist user 106 to assess software application installation 102. In one embodiment of the invention, software installation module 104 logs a set of application programming interface ("API") calls generated during an installation process with timestamps. These API calls (e.g., MsiGetFeatureState or MsiGetComponentState of MSI) typically provide insights into software package interdependencies. Other API calls may include functions that determine if a file exists, read a registry key, co-create an object, etc. The log file generated by software installation module 104 allows user 106 to assess whether and how to deploy/un-deploy software installations. In addition, under the direction of user 106 (e.g., by clicking a button), software installation module 104 is able to develop a deterministic process by which it can modify the installation parameters, rerun the installation, and provide the new results to user 106. For example, if software application installation 102 reads an existing registry key, then software installation module 104 can rerun software application installation 102 when the key does not exist or when its value has been modified to observe the installation behavior. Thus, via software installation module 104, user 106 is able to determine the complete range of installation behaviors under any particular system configuration upon which software application installation 102 will be installed.

FIG. 2 illustrates a block diagram of software installation module 104, according to one embodiment of the present invention. As illustrated in FIG. 1, software installation module 104 is configured to receive software application installation 102. In one embodiment of the invention, software installation module 104 includes an extraction module 202, an execution module 204, and a user interface module 206. The extraction module 202 is configured to accept software application installation 102 as input and extract native code from software application installation 102. While not part of the software application, the native code may provide assistance to installation of the software application and thus contain information regarding the underlying behaviors of software application installation 102. For example, the native code may determine what other software packages are installed in a system in order to decide where to install a particular component of the software application. In another example, the native code may identify the version of software application installation 102, determine if there are service packs available for software application installation 102, and look for resources that provide updates to software application installation 102 (e.g., via a network such as the Internet). By analyzing the native code, user 106 can determine why it is necessary for software application installation 102 to execute the native code and find out about the underlying behaviors and interdependency of software application installation 102.

Execution module 204 executes the native code to determine the underlying behaviors of software application installation 102. Specifically, execution module 204 can modify the installation parameters and rerun the installation. For example, as discussed, if software application installation 102 reads an existing registry key, then execution module 204 can rerun software application installation 102 when the key does not exist or when its value has been modified to observe the installation behavior.

Upon execution of the native code, user interface module 206 provides information (e.g., via a display) to user 106 regarding the native code, such as a list of registry keys and files read or changed by the native code. In one embodiment of the invention, user interface module 206 is configured to timestamp this information, for example, by providing an ordered list based on the activities executed by the native code. More specifically, user interface module 206 provides an ordered list of API calls made by the native code and the resulting changes to the physical configuration (e.g., registry keys, files, etc.). In one embodiment of the invention, the native code may be executed by the MsiDoAction API for MSI installations.

Figure 3:
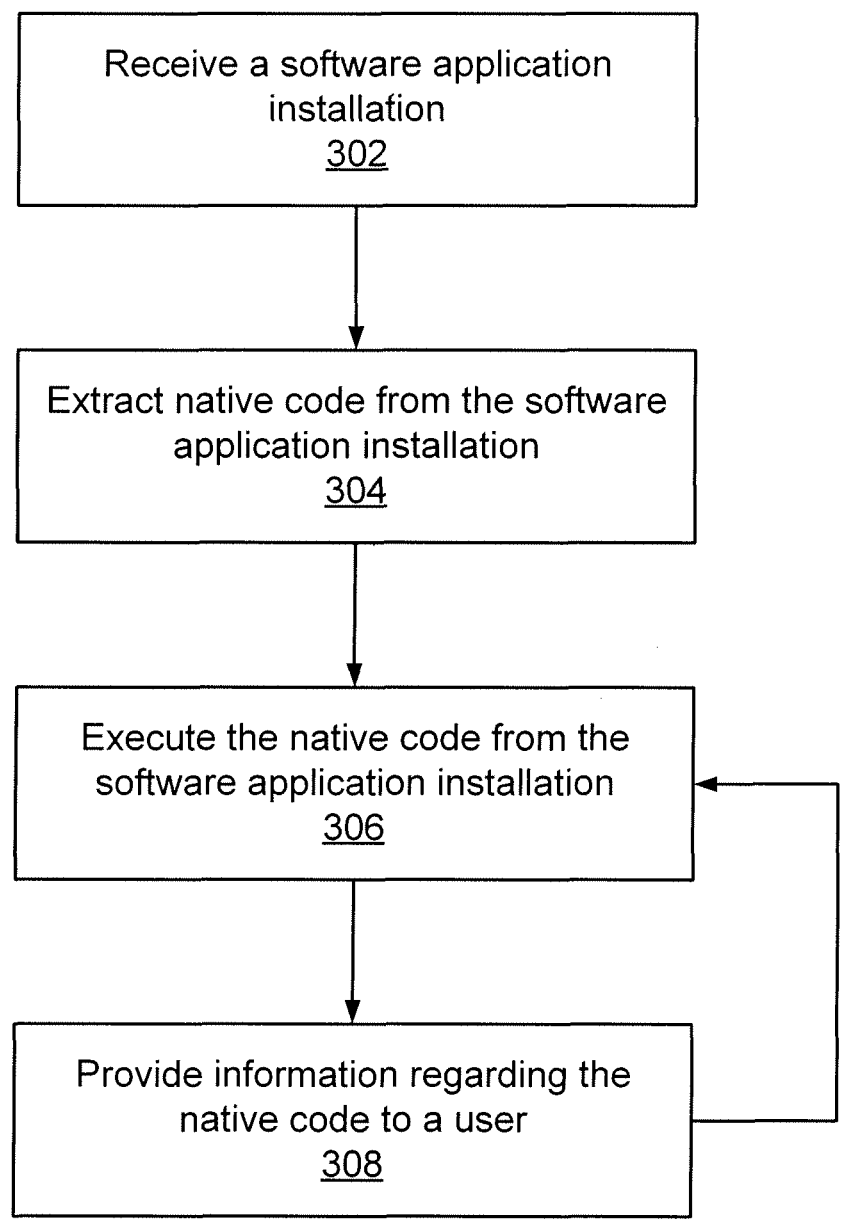
FIG. 3 illustrates a flow diagram of an exemplary process of assessing deployment or un-deployment of software application installations, according to one embodiment.

FIG. 3 illustrates a flow diagram of an exemplary process of assessing deployment and un-deployment of a software application installation, according to one embodiment. In FIG. 3, a software installation module 104 receives a software application installation 102. (302) An extraction module 202 then extracts native code embedded within software application installation 102. (304) An execution module 204 executes the extracted native code. (306) A user interface module 206 provides the results of the execution to a user 106, for example by providing information about what API calls were made by the native code. (308) Thus, the user 106 is able to learn about the underlying behaviors of software application installation 102. In one embodiment of the invention, the execution step 306 is repeated after the results of the execution are provided to user 106.

Figure 4:
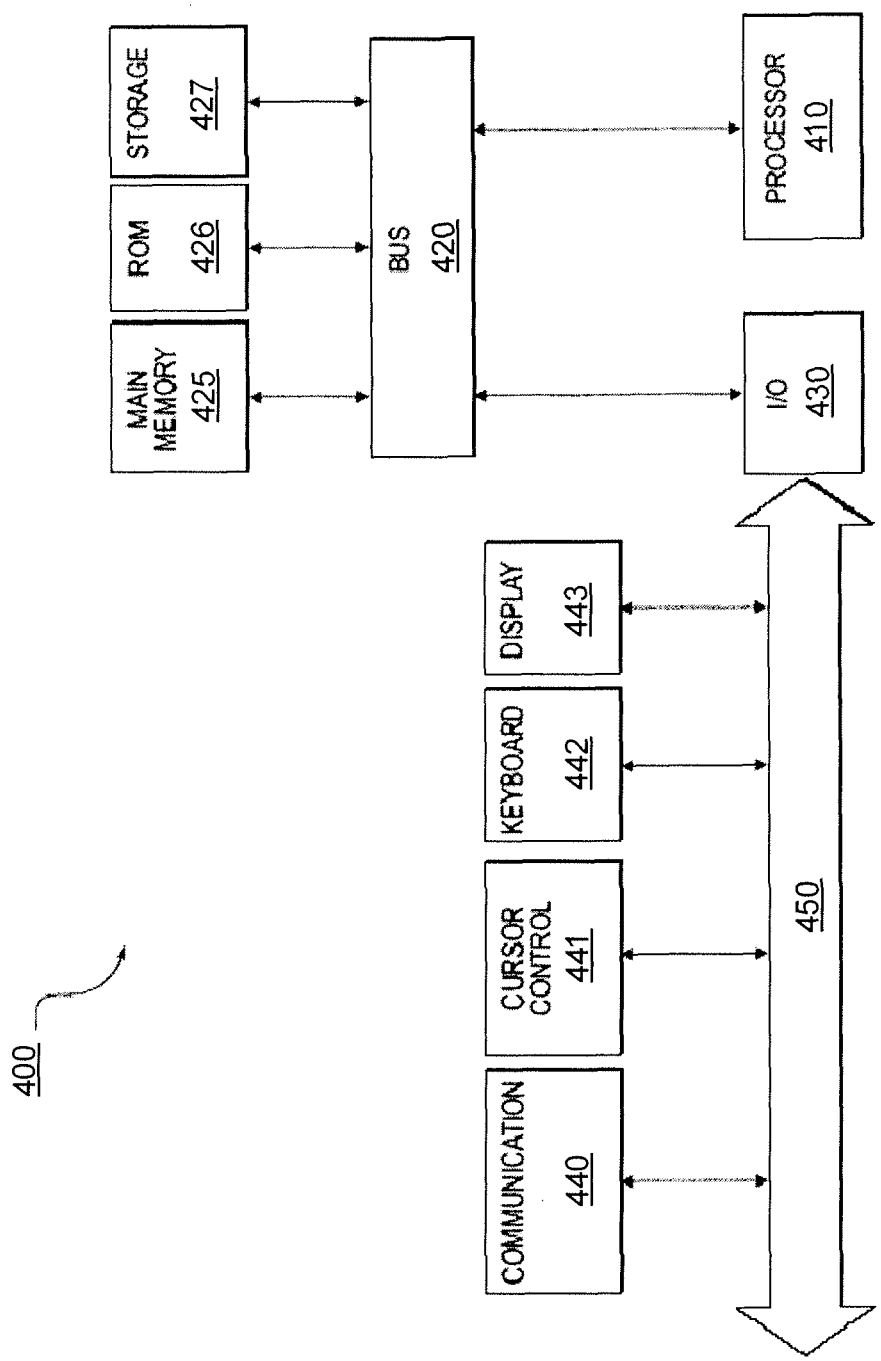
FIG. 4 illustrates an exemplary computer architecture for use with the present system, according to one embodiment.

FIG. 4 illustrates an exemplary computer architecture for use with the present system, according to one embodiment. Computer architecture 400 can be used to implement the computer systems described in various embodiments of the invention, including any of the software installation module 104, extraction module 202, execution module 204 and user interface module 206. One embodiment of architecture 400 comprises a system bus 420 for communicating information, and a processor 410 coupled to bus 420 for processing information. Architecture 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Architecture 400 also may include a read only memory (ROM) and/or other static storage device 426 coupled to bus 420 for storing static information and instructions used by processor 410.

A data storage device 427 such as a magnetic disk or optical disc and its corresponding drive may also be coupled to computer system 400 for storing information and instructions. Architecture 400 can also be coupled to a second I/O bus 450 via an I/O interface 430. A plurality of I/O devices may be coupled to I/O bus 450, including a display device 443, an input device (e.g., an alphanumeric input device 442 and/or a cursor control device 441). For example, web pages and business related information may be presented to the user on the display device 443.

The communication device 440 is for accessing other computers (servers or clients) via a network. The communication device 440 may comprise a modem, a network interface card, a wireless network interface or other well known interface device, such as those used for coupling to Ethernet, token ring, or other types of networks.

Although the present method and system have been described in connection with a software installation system, one of ordinary skill would understand that the techniques described may be used in any situation where it is to analyze behaviors of software applications.

A method and system for assessing deployment and undeployment of a software application installation are disclosed. In one embodiment, the method comprises receiving as an input a software application installation. Native code is extracted from the software application installation and executed. Information regarding the execution of the native code is provided to a user.

We claim:

1. A computer-implemented method, comprising:
    receiving as an input a software application installation;
    extracting native code from the software application installation;
    executing, by a processor, the native code;
    providing, to a user, information regarding the execution of the native code, wherein the information enables an assessment of the software application installation;
    wherein the software application installation is retired or transitioned into a new enterprise network based on the information and the assessment; and
    wherein the provided information includes:
        application programming interface calls made by the native code, and
        when each application programming interface call and physical configuration change was made by the native code, said physical configuration including registry keys and files read by the native code.

2. The method of claim 1, wherein said physical configuration includes files changed by said native code.

3. A non-transitory computer-readable medium having stored thereon a plurality of instructions, said plurality of instructions when executed by a computer, cause said computer to perform:
    extracting native code from the software application installation;
    executing the native code;
    providing information, to a user, regarding the execution of the native code, wherein the information enables an assessment of the software application installation;
    wherein the software application installation is retired or transitioned into a new enterprise network based on the information and the assessment; and
    wherein the provided information includes:
        application programming interface calls made by the native code, and
        when each application programming interface call and physical configuration change was made by the native code, said physical configuration including registry keys and files read by the native code.

4. The computer-readable medium of claim 3, wherein said physical configuration includes files changed by said native code.

5. A computer system, comprising:
    a processor; and
    memory coupled to the processor, the memory storing instructions;
    wherein the instructions when executed by the processor cause the processor to:
        receive as an input a software application installation;
        extract native code from the software application installation;
        execute the native code; and
        provide, to a user, information regarding the execution of the native code, wherein the information enables an assessment of the software application;
    wherein the software application installation is retired or transitioned into a new enterprise network based on the information and the assessment; and
    wherein the provided information includes:
        application programming interface calls made by the native code, and
        when each application programming interface call and physical configuration change was made by the native code, said physical configuration including registry keys and files read by the native code.

6. The computer system of claim 5, wherein said physical configuration includes files changed by said native code.

* * * * *